United States Patent Office 3,322,803
Patented May 30, 1967

3,322,803
PROCESS FOR THE PRODUCTION OF COMPLEX COMPOUNDS OF DIVALENT TITANIUM
Friedrich Vohwinkel, Hanau, and Gerhard Preusser, Frankfurt am Main, Germany, assignors, by mesne assignments, to Vickers-Zimmer Aktiengesellschaft Planung und Bau von Industrieanlagen, Borsigallee, Frankfurt am Main, Germany, a corporation of Germany
No Drawing. Filed Feb. 15, 1963, Ser. No. 258,916
Claims priority, application Germany, Mar. 6, 1962, Z 9,271
6 Claims. (Cl. 260—429.5)

It is known that boiling of aluminum powder, aluminum chloride and titanium tetrachloride in benzene results in the formation of a well defined, well crystallizing compound having the composition $C_6H_6TiAl_2Cl_8$. The compound was identified as a titanium (II)-aluminum chloride-benzene complex (see G. Natta, G. Mazzanti and G. Pregaglia, Tetrahedron London 1960, 86; H. Martin and F. Vohwinkel "Berichte," 94 (1961), 2416, and F. Vohwingel, Thesis, Aachen, 1961).

When producing the titanium (II)-aluminum chloride-benzene complex by processes known up to the present, it was found to be necessary for the aluminum powder to be finely ground in a heptane solution of aluminum alkyl compounds in an inert gas atmosphere before the reaction. A further disadvantage of the prior art processes resides in the fact that it is necesasry for obtaining satisfactory yields of the complex compound to stir the reaction mixture for at least 13 hours and preferably for 20 to 24 hours at an elevated temperature, i.e. that relatively long reaction periods are required.

It is an object of this inventon to provide an improved process for the production of titanium (II)-aluminum halide-aromatic complexes which hereinafter are briefly referred to as aromatic complexes. In this process in contrast to previously known processes, other metals besides aluminum may also be used as reducing agents and high yields of aromatic complexes are obtained within a shorter reaction period than by the prior art processes by activation of the reducing agents effected in a simple manner.

The process of the invention comprises reacting titanium trihalides or titanium tetrahalides with activated metals of the 1st to 3rd main groups and the 2nd subgroup of the Periodic Table in the presence of aluminum halides at an elevated temperature to form titanium (II)-aluminum halide-aromatic complexes. The resultant aromatic complexes have the general formula $RTiAl_2X_8$ wherein X may be like or different halogen residues and R is an aromatic hydrocarbon. In addition to benzene and its alkyl homologues, R also comprises substituted aromatics, e.g. halogenated aromatics, and polycyclic and partially hydrogenated polycyclic aromatics such as, for example, tetralin and substitution products thereof.

A further special characteristic of the invention described herein consists in that the metals used as reducing agents are activated by heating them, before the addition of the titanium compound, for a short period of time, e.g. 10 to 60 minutes, to a temperature between 100 and 250° C. in the absence of organic solvents and under an inert gas atmosphere while thoroughly mixing them with the aluminum halide.

The advantages of the process of the invention reside in the fact that metals other than aluminum may also be used as reducing agents and the reaction periods for the prepration of the aromatic complexes are substantially reduced by activation of the metal used as reducing agent. Further advantages of the process described consist in that the metals, for their activation with aluminum halide, may be used in their commercial forms, e.g. as powder, turnings, grit or chips and that tedious dispersing, grinding or storing of the metal under solutions of aluminum alkyls and subsequent washing before use is no longer required.

Titanium compounds which are suitable as starting materials include titanium trihalides, especially titanium tetrahalides such as titanium trichloride, titanium tribromide, titanium tetraiodide, titanium tetrabromide and especially titanium tetrachloride.

Preferred aluminum halides are the chlorides, bromides and iodides.

Preferred among suitable metals are lithium, sodium, potassium, beryllium, magnesium, strontium, barium, boron, aluminum, gallium, thallium, zinc and cadmium. Alloys or mixtures of two or more of the metals listed above may be used advantageously.

The relative proportions of the materials mentioned above, i.e. titanium compound, aluminum halide and metal, may be varied within wide limits. It is advantageous to use an excess of the reducing agent and of the aluminum halide. Satisfactory yields are obtained with molar ratios of titanium compound to aluminum halide to metal within the ranges of 1:1.3:1 to 1:20:50 and preferably between 1:2:2 and 1:6:20.

Examples of suitable aromatics in the presence of which the process is desirably carried out include benzene, toluene, xylenes, mesitylene, ethyl benzene, cumene, chlorobenzene, naphthalene and tetralin.

The process may be carried out within a wide temperature range, i.e. between about $+50°$ C. and $+180°$ C. The reaction is generally effected under atmospheric pressure. However, reduced or superatmospheric pressures may also be used. Thus, elevated pressures of, for example, as high as 10 atmospheres are necessary sometimes when using low boiling starting materials and using elevated reaction temperatures.

For carrying out the process, the metal used as the reducing agent, e.g. in the form of powder, turnings, grit or chips, is first activated by heating it with aluminum halides for a short period of time, e.g. for 10 to 60 minutes, to temperatures between 100 and 250° C. in an inert gas atmosphere and in the absence of organic solvents while vigorously mixing. After cooling, the anhydrous aromatic solvent and the titanium compound are added to the "developed" mixture of metal and aluminum halide. Following this, the mixture is heated to temperatures of between $+50°$ and $+180°$ C. while vigorously stirring. It is also possible to add the titanium compound which is dissolved or suspended in the aromatic solvent to the previously heated mixture of metal, aluminum halide and solvent, the addition being effected at a rate which corresponds to the formation of the aromatic complex. When suitably directing the reaction, the aromatic complexes are obtained in good yields after reaction periods of only slightly more than one hour up to eight hours. They are obtained as solutions in the aromatic hydrocarbon and can be easily separated from contaminations or reactants used in excess by filtration while still hot. The aromatic complexes are obtained in crystalline form when concentrating and cooling the solutions. Still more rapid isolation of the aromatic complexes is achieved by diluting their aromatic solutions with aliphatic hydrocarbons. The aromatic complexes are only sparingly soluble in the latter and precipitate from the mixture of the solvents in crystallized form. The combined molecule of the aromatic compound is not split off in this case.

The process may also be carried out continuously. For example, in case of soluble titanium compounds, use is made of a heatable reaction tube in which a "developed" mixture of metal and aluminum halide is fixedly or movably arranged and continuously supplemented. The titanium compound dissolved in an aromatic hydrocarbon is, if desired, recycled through the heated reaction tube. The solids are retained at the tube end by suitable means while the effluent solution of the aromatic complex may be withdrawn continuously.

The aromatic complexes, as a rule, are well crystallizing substances of deep violet to almost black color depending upon the aromatics combined. They are extremely sensitive to air and moisture. When kept under inert gas, the substances even in their solutions are stable for an extended period of time without decomposition. When heated, the aromatic complexes are decomposed into the molecule of the aromatic compound, aluminum halide and titanium dihalide. The decomposition temperature is dependent upon the type of the combined aromatic compound and of the halogen. For example, the titanium (II)-aluminum chloride-benzene complex is decomposed under high vacuum already at about 80° C. while the corresponding mesitylene complex is still stable at about 180° C.

The aromatic complexes obtainable by the process described above are valuable starting products for the preparation of catalysts for the stereospecific polymerization of olefins and vinyl compounds. Simple processes lead from the aromatic complexes to the preparation of titanium subhalides or titanium metal. The divalent titanium present as aromatic complex in dissolved form may also be used as reducing agent in organic chemistry. Moreover, the aromatic complexes represent highly active Friedel-Crafts catalysts due to their high content of aluminum halide.

The following examples are given to illustrate the invention and not to limit it.

EXAMPLE 1

1.0 mol aluminum powder is heated for 35 minutes at 150° C. with 0.3 mole aluminum chloride in an inert atmosphere while thoroughly mixing. After cooling to room temperature, 250 ml. of dry air-free toluene are added and the mixture is heated to 100° C. while thoroughly stirring. Then 0.15 mole titanium tetrachloride dissolved in 50 ml. toluene are added dropwise within 1 hour. After refluxing for 4 hours, the stirrer is stopped, the mixture allowed to settle for a short period of time and the dark violet solution is filtered through a G-3 frit while still hot. The filtrate is concentrated to dryness under a slight vacuum. There are obtained dark violet crystals in a yield of 92% based on $TiCl_4$ charged. After two recrystallizations from toluene and precipitation with hexane, the crystals rather exactly correspond to the composition $C_6H_5CH_3TiAl_2Cl_8$.

Calculated: Ti 10.03%; Al 11.30%; Cl 59.43%. Found: Ti 10.01%; Al 11.35%; Cl 59.58%.

EXAMPLE 2

0.75 mole of sodium freed from crusts were heated with 0.25 mole aluminum chloride for 30 minutes at 100° C. Care is taken by thorough stirring that the fused metal is dispersed well in the aluminum chloride. The mixture while still hot is mixed with 200 ml. air-free and dry xylene, heated to 130–135° C. while constantly stirring and then mixed with 0.1 mole of titanium tetrachloride dissolved in 50 ml. xylene and added within 80 minutes. After the addition, stirring is continued for 20 minutes and then the mixture is filtered hot through a G-3 frit. The filtrate is concentrated under vacuum and the concentrated solution is mixed with 300 ml. of heptane. The crystalline aromatic complex is obtained in a yield of 51% based on $TiCl_4$.

EXAMPLE 3

The procedure described in Example 1 is repeated except that benzene is substituted for toluene, titanium tetrabromide is substituted for titanium tetrachloride and aluminum bromide is substituted for aluminum chloride. The reaction is carried out at 80° C. within 5 hours. The filtrate is mixed with 600 ml. hexane whereupon crystals of the aromatic complex having a deep dark red to violet color precipitate. The yield of $C_6H_6TiAl_2Br_8$ is 76%, based on $TiBr_4$.

When repeating Examples 1 to 3 except that different reactants and other activation conditions for the reducing agent are used, the results shown in the following table are obtained. Activation conditions are understood to be the reaction periods and temperatures observed when jointly heating the metal and aluminum halide. When the periods and temperatures listed under "reaction conditions" are used for the reaction of the mixture of activated metal, aluminum halide, titanium compound and aromatic solvent, then the yields of aromatic complex shown in the last column of the table are obtained.

| Ex. | Reactants | Activation Conditions | | Reaction Conditions | | Yield of Aromatic Complex based on Titanium Compound, Mol Percent |
|---|---|---|---|---|---|---|
| | | Time, Min. | Temp., °C. | Time, Hrs. | Temp., °C. | |
| 4 | 1.2 mols potassium<br>0.2 mols aluminum chloride<br>0.1 mols titanium tetrachloride<br>250 ml. toluene | 15 | 100 | 1.5 | 110 | 67 |
| 5 | 0.8 mols magnesium powder<br>0.2 mols aluminum bromide<br>0.1 mols titanium tetrabromide<br>250 ml. xylene | 45 | 180 | 5 | 130 | 60 |
| 6 | 1.0 mol zinc powder<br>0.3 mols aluminum chloride<br>0.1 mols titanium tetrachloride<br>250 ml. benzene | 60 | 160 | 8 | 80 | 45 |
| 7 | 1.0 mol calcium grit<br>0.5 mols aluminum bromide<br>0.1 mols titanium tetrabromide<br>250 ml. toluene | 45 | 200 | 5 | 110 | 68 |
| 8 | 0.6 mols aluminum powder<br>0.2 mols aluminum chloride<br>0.1 mols titanium tetrachloride [1]<br>250 ml. mesitylene | 30 | 160 | 4 | 125 | 96 |
| 9 | 1.0 mol aluminum grit<br>0.3 mols aluminum iodide<br>0.1 mols titanium tetraiodide<br>1200 ml. toluene | 30 | 240 | 5 | 110 | 42 |
| 10 | 0.8 mols aluminum powder<br>0.4 mols aluminum chloride<br>0.1 mols titanium tetrachloride<br>250 ml. ethyl benzene | 20 | 160 | 4 | 130 | 54 |
| 11 | 1.0 mol lithium<br>0.2 mols aluminum bromide<br>0.1 mols titanium tetrabromide<br>300 ml. toluene | 10 | 180 | 2 | 110 | 59 |

[1] Brown modification.

What is claimed is:

1. A process for the production of titanium (II) aluminum halide aromatic complexes which comprises heating a mixture of an aluminum halide and a metal selected from the first to the third main group and second subgroup for a short period of time at a temperature of between 100 and 250° C. in an inert gas atmosphere in the absence of organic solvents, thereafter heating the resulting mixture containing said metal in active form with at least one member selected from the group consisting of titanium (III) and titanium (IV) halide and an aromatic solvent at a temperature of between 50 and 180° C.

2. Process according to claim 1 wherein said titanium compound is a member selected from the group consisting of titanium trichloride, titanium tribromide, titanium triiodide, titanium tetraiodide, titanium tetrabromide, and titanium tetrachloride.

3. Process according to claim 1 wherein said aluminum halide is a member selected from the group consisting of aluminum chloride, aluminum bromide, and aluminum iodide.

4. Process according to claim 1 wherein said metal is a member selected from the group consisting of lithium, sodium, potassium, beryllium, magnesium, strontium, barium, boron, aluminum, gallium, thallium, zinc, and cadmium, and mixtures and alloys thereof.

5. Process according to claim 1, wherein the stoichiometric ratio of titanium compound to aluminum halide to activated metal ranges from 1:1.3:1 to 1:20:50.

6. Process according to claim 1, wherein the stoichiometric ratio of titanium compound to aluminum halide to activated metal ranges from 1:2:2 to 1:6:20.

References Cited

UNITED STATES PATENTS

| 2,787,626 | 4/1957 | Redman | 260—448 |
| 2,921,876 | 1/1960 | Dobratz | 260—448 |
| 2,953,586 | 9/1960 | Hafner et al. | 260—429.5 X |
| 3,093,625 | 6/1963 | Friederich et al. | 252—429 |

TOBIAS E. LEVOW, *Primary Examiner.*

H. M. S. SNEED, *Assistant Examiner.*